(12) United States Patent
Ferguson

(10) Patent No.: US 7,342,890 B1
(45) Date of Patent: Mar. 11, 2008

(54) DATA DUPLICATION FOR TRANSMISSION OVER COMPUTER NETWORKS

(75) Inventor: Dennis C Ferguson, Palo Alto, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1022 days.

(21) Appl. No.: 10/392,736

(22) Filed: Mar. 19, 2003

Related U.S. Application Data

(60) Provisional application No. 60/435,843, filed on Dec. 20, 2002.

(51) Int. Cl.
*G01R 31/08* (2006.01)
*H04L 12/28* (2006.01)
*G06F 15/173* (2006.01)

(52) U.S. Cl. .............. 370/238; 370/351; 370/390; 709/238

(58) Field of Classification Search ........... 370/218, 370/216, 220, 235, 238, 401, 352, 389, 390, 370/392, 395.1, 394; 714/47, 4
See application file for complete search history.

(56) References Cited

U.S. PATENT DOCUMENTS

| | | | |
|---|---|---|---|
| 6,324,162 B1 * | 11/2001 | Chaudhuri | 370/225 |
| 6,674,744 B1 * | 1/2004 | Doshi et al. | 370/352 |
| 6,714,549 B1 * | 3/2004 | Phaltankar | 370/397 |
| 6,721,269 B2 * | 4/2004 | Cao et al. | 370/227 |
| 6,751,746 B1 * | 6/2004 | Jain et al. | 714/4 |
| 7,248,561 B2 * | 7/2007 | Ishibashi et al. | 370/228 |

OTHER PUBLICATIONS

U.S. Patent Application to Der-Hwa Gan having U.S. Appl. No. 09/795,454, filed Mar. 1, 2001 and entitled "Method and Apparatus for Computing a Backup Path Using Fate Sharing Information."

* cited by examiner

*Primary Examiner*—Hanh Nguyen
(74) *Attorney, Agent, or Firm*—Shumaker & Sieffert, P.A.

(57) ABSTRACT

Techniques are described that increase the reliability and quality of data transmissions of computer networks. The techniques provide for the generation of at least two duplicate data flows for carrying data in a computer network. The duplicate data flows are transmitted to a receiving device along paths within one or more intermediate networks. In addition, network devices, such as routers or switches within the network, for example, may cooperate to select paths for the data flows that have reduced or minimal common network elements. The network devices may share "fate-sharing" information that relates groups of network elements according to common characteristics, attributes or shared resources, e.g., a shared power supply, close proximity, common physical interface, for the purposes of facilitating selection of independent paths.

7 Claims, 8 Drawing Sheets

/— 70

| NETWORK GROUP | COST |
|---|---|
| NODES 62B, 62C | 500 |
| NODES 62F, 62G | 600 |
| LINKS 62A-62B, 62B-62C, 62C-62E | 400 |
| LINKS 62F-62G | 600 |

| PRIMARY PATH | BACKUP PATH |
|---|---|
| 62A, 62B, 62C, 62E | 62F, 62G, 62D, 62H |

| PRIMARY PATH | BACKUP PATH |
|---|---|
| 62E, 62C, 62B, 62A | 62H, 62D, 62G, 62F |

FIG. 9

DATA DUPLICATION FOR TRANSMISSION OVER COMPUTER NETWORKS

This application claims priority from U.S. provisional application Ser. No. 60/435,843 filed Dec. 20, 2002, the entire content of which is incorporated herein by reference.

TECHNICAL FIELD

The invention relates to computer networks and, more particularly, to techniques for transferring information over computer networks.

BACKGROUND

The transfer of time-sensitive information over computer networks, such as the transfer of voice information over the Internet, is rapidly gaining acceptance. The information is carried by discrete units of data, referred to as packets or cells, and carried from a sending device to a receiving device. Depending on the particular computer network, one or more protocols may be used to carry the information, e.g., Frame Relay, Internet Protocol (IP) and Asynchronous Transfer Mode (ATM). In contrast to the public telephone network, for example, which is a circuit switching technology designed to carry voice transmissions, Frame Relay and IP networks insert information into variable-sized frames or packets. ATM networks chop information into small cells, which facilitate fast switching of the data through the network.

In the public telephone system, a path from the sender to the receiver is dedicated to transmission of the data for the duration of a call, which is sent as a continuous data stream over a dedicated circuit. In other words, the line is monopolized by a call until the call is terminated, even when the caller is put on hold and during periods of silence. Although this system guarantees reliable and immediate transmission of voice, it often results in very inefficient use of bandwidth. Consequently, the transfer of certain information, such as a voice, over computer networks can be an attractive means for reducing long-term costs associated with existing systems. For example, by implementing Voice over IP (VoIP) and transporting the voice information over the Internet, expensive circuit-switched networks can be replaced by a less expensive and more bandwidth-efficient solution.

The transmission of information over conventional computer networks often has requirements for reliability of the network infrastructure that are unique compared to other applications. In particular, unlike most data applications that have been used with conventional computer networks, voice and video are very sensitive to time delay, i.e., latency. Good voice and video quality requires recreation of the conversation, with substantially the same tone, inflection, pauses and intonation used by the speakers.

While all applications benefit from the reliability and fault tolerance usually offered by packet or cell-based networks, typical applications are sufficiently robust to survive failure detection and recovery times that may be on the order of many seconds without significant disruption. Due to the shared nature of computer networks, significant time may be required for data transmissions to travel across the network depending on current network conditions. A transmission, for example, can be delayed because of network congestion. Network events, such as a link failure, router failure, network attack, and the like, can result in dropped packets, which detrimentally affect the integrity of voice transmissions. For voice transmissions, these delays between packets result in unnatural speech and interfere with the conversation. Dropped packets result in clipped speech and poor voice quality. Even short delays, e.g., delays of a second or less, may cause the voice caller to hang up, lead to overlap in speech between the callers, or cause the speaker to hear an echo of his or her voice. Video and other time-sensitive data transmissions have similar problems. Fax and modem transmissions are even more sensitive to the quality of the transmission and are less tolerant of dropped packets than voice.

As a result, a common technique for transmitting time-sensitive information is to reserve a backup network path in the event a network error or other event negatively impacts communication over an original path. Moreover, conventional computer networks are often designed to reduce a "failover time" to reroute traffic from the original network path to the backup path, thereby reducing any impact of the network event on the transmission of the time-sensitive information. In many cases, conventional networks are designed to reduce the failover time to a sub-second interval, and possibly 50 ms or less. As a result, significant resources, e.g., cost, labor, computing resources, and the like, may be utilized in an attempt to reduce the failover time.

SUMMARY

In general, the invention is directed to techniques that increase the reliability and quality of voice transmissions of computer networks. In particular, the techniques provide for the generation of at least two duplicate data flows for carrying a voice transmission of a computer network. The duplicate data flows are transmitted to the receiving device along paths within one or more intermediate networks. In addition, network devices, such as routers or switches within the network, for example, cooperate to select paths for the data flows that have reduced or minimal common network elements (infrastructure), referred to herein as "independent" paths. The network devices may share "fate-sharing" information that relates groups of network elements according to common characteristics, attributes or shared resources, e.g., a shared power supply, close proximity, common physical interface, for the purposes of facilitating selection of independent paths.

In one embodiment, a method comprises selecting paths through a network based on sharing of network elements by the paths, and concurrently forwarding duplicate data along the selected paths.

In another embodiment, a method comprises receiving voice information from a voice communication device, and generating duplicate voice information from the received voice information. The method further comprises selecting paths through the network based on sharing of network elements by the paths, and concurrently forwarding the duplicate voice information along the selected paths.

In another embodiment, a network device comprises a path selection module to select a plurality of paths through a network based on sharing of network elements by the paths, and a forwarding module to concurrently forward duplicate data along the selected paths.

In another embodiment, a system comprises a voice communication device to generate voice information, a gateway to duplicate the voice information, and a set of one or more network devices. The network devices concurrently forward the duplicate voice information along a plurality of paths through a computer network.

In another embodiment, a system comprises a voice communication device to generate voice information, and a network device to select a plurality of paths through a network based on sharing of network elements by the paths. The network device duplicates the voice information and concurrently forwards the duplicate voice information along the paths.

In another embodiment, a computer-readable medium comprises instructions to cause a control unit of a network device to select a plurality of paths through a network based on sharing of network elements by the paths, and concurrently forward duplicate data along the selected paths.

The invention may provide one or more advantages. For example, the techniques may reduce the potential degradation of voice quality due to network events. In general, N duplicate data flows for carrying a voice transmission could be generated and forwarded between the sending device and the receiving device along N independent paths having little or no common network elements. These duplicate data flows provide a degree of redundancy that avoids degradation of the voice transmission due to isolated network events. In other words, this may have the benefit of requiring N network events that overlap in time before resulting in dropped packets and voice quality degradation. Consequently, a single network event, such as link failure or denial of service attack, will not cause a service disruption to the voice traffic.

In addition, the multi-second failure detection and recovery time that is common in packet-based systems is the only limiting factor on quality to the extent this time increases the potential for such simultaneous events to occur. If failures occur at infrequent intervals in comparison to the recovery time, which is typically the case in packet and cell-based networks, this exposure can be insignificant.

Moreover, the use of duplicate data flows may achieve cost saving in comparison with conventional approaches that strive to reduce a failover time from an original path to a backup path. For example, although the described techniques may utilize more overall network and computing resources due to the duplicate packet flows, overall cost may be reduced because relatively less expensive computing devices may be used in comparison with conventional approaches that require high-performance, expensive computing devices to reroute network traffic in the event of a network failure or other event.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 7 illustrates example data structures maintained by a network device to associate cost information with network elements for selection of paths for duplicate voice information.

FIGS. 8 and 9 illustrate example data structures maintained by network devices to describe the independent paths.

DETAILED DESCRIPTION

Figure 1:
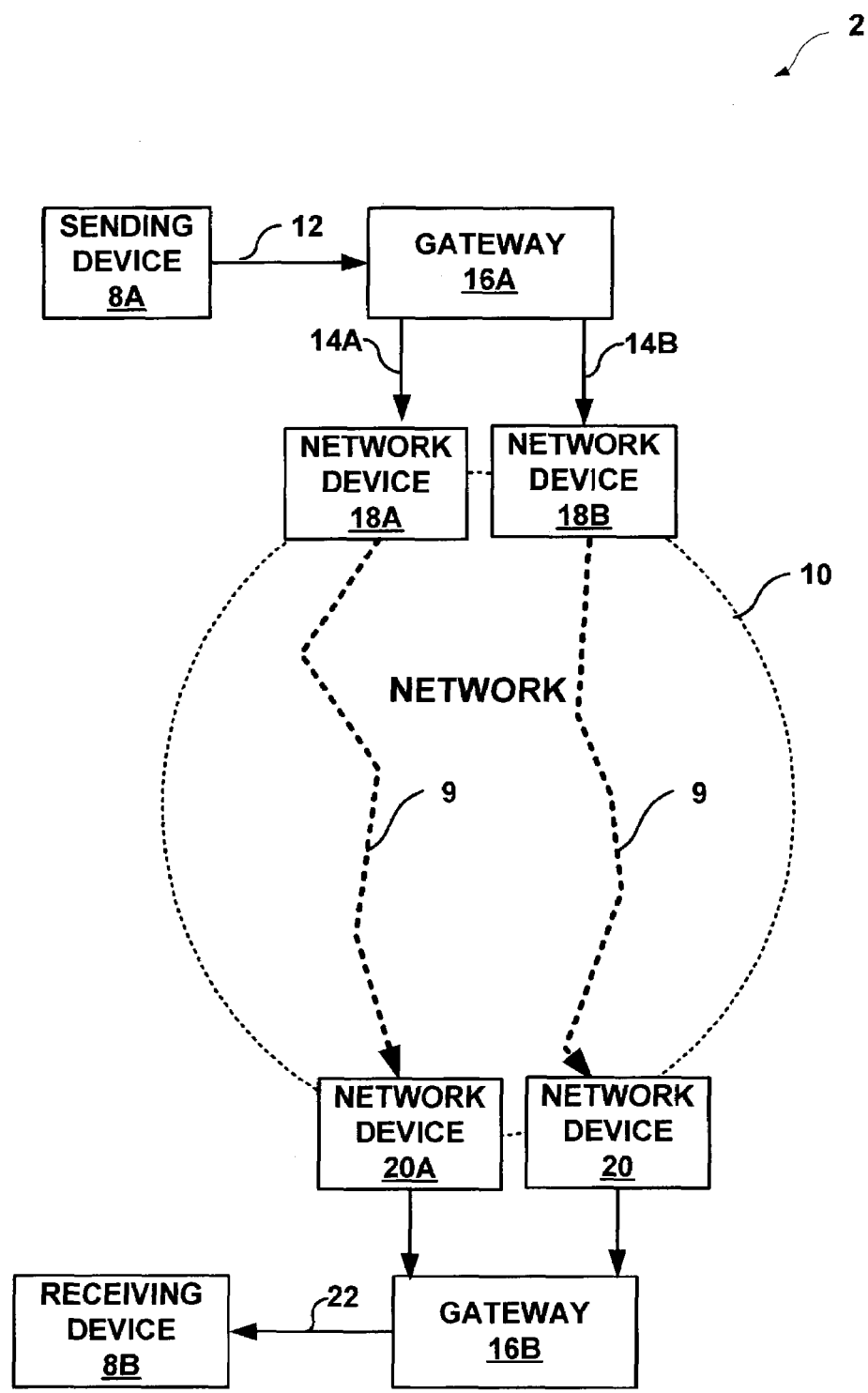
FIG. 1 is a block diagram illustrating an example system that makes use of data duplication for transmission of voice information in accordance with the principles of the invention.

FIG. 1 is a block diagram illustrating an example system 2 that makes use of data duplication for transmission of information in accordance with the principles of the invention. System 2 will be described using voice transmission as an example of one type of data transmission, but any type of data may be transmitted using techniques consistent with the principles of the invention described therein. As shown in FIG. 1, system 2 includes sending voice communication device 8A, and receiving voice communication device 8B (herein voice communication devices 8) that communicate voice information via network 10. Exemplary voice communication devices 8 may include conventional land-line telephones, EP-equipped telephones, cellular radiotelephones, satellite phones, computers with IP telephony capabilities, and the like. In the case of wireless communication, voice communication devices 8 may communicate according to one or more wireless communication standards, such as CDMA, GSM, WCDMA, and the like. Network 10 may represent a packet-based network, a switched telecommunication network, or a combination thereof.

Each of voice communication devices 8 may be coupled to network 10 via respective gateways 16A, 16B (herein gateways 16). Gateways 16 provide a set of facilities for managing the transmission of voice information using, for example, the Internet Protocol (IP). Gateway 16A receives voice information 12 from sending device 8A, and provides the voice information to network 10 in digital form as discrete packets, cells or other units of data. Gateway 16A may receive voice information 12 in any of a variety of forms, such as digital, analog, wireless, and the like.

Gateway 16A receives voice information 12, and produces one or more duplicate data flows 14 for carrying the voice information over computer network 10. In the illustrated example, gateway 16A generates two duplicate data flows 14A, 14B, and sends the data flows to two network devices 18A, 18B (herein network devices 18). Network devices 18 may comprise routers, switches, hubs, network gateways, proxy servers and the like.

Data flows 14 may be viewed as duplicate flows in that each flow carries complete voice information 12 received from sending device 8A. For packet-based communication, gateway 16A may generate data flow 14B by duplicating each data unit, e.g., packet, of data flow 14A. Duplicate packets, for example, may carry identical or similar header information, sequence numbers, and payload.

In accordance with the principles of the invention, network devices 18 may cooperate to select wholly or partially independent paths 9 for carrying data flows 14. For example, network devices 18 may select paths 9 to have reduced or minimal common infrastructure within network 10. Network devices 18 may use a variety of mechanisms to select and establish independent paths. For example, network devices 18 may exchange information to ensure the paths are independent, may receive configuration information defining separate paths, or may send and/or receive communications to/from other network elements to discover independent paths, or some combination of these mechanisms. As one example, for packet-based communications, network devices 18 may be preconfigured to establish separate label switched paths (LSPs) for carrying VoIP packets from gateway 16. Alternatively, network devices 18 may perform route resolution based on the topology of network 10 to select different next hops for the packet flows, i.e., different neighbor devices within network 10 to which to forward the duplicate packets. As another example, for cell-based communications, network devices 18 may establish separate virtual circuits for carrying the separate data flows 14.

Network devices 20A, 20B receive the duplicate data flows from network 10, and forward the data flows to gateway 16B. Gateway 16B disregards duplicate data from the data flows, and outputs voice information 22 to receiving device 8B. As one example, for packet-based communications, gateway 16B may examine sequence numbers or other information within the received packets to identify duplicates. In this manner, receiving device 8B may receive only a single data flow carrying voice information 22 formed from multiple data flows 14. Receiving device 8B processes the continuous stream of voice information 22, typically by decoding and synthesizing the voice information to produce audible output.

These techniques may have the effect of increasing the reliability and quality of voice transmissions between sending device 8A and receiving device 8B. For example, these techniques may have the benefit of requiring multiple network events that overlap in time before resulting in dropped packets and voice quality degradation. Consequently, one or more network events, such as link failures, denial of service attacks, and the like, that do not affect all of paths 9 will not cause a service disruption to the voice information 22 provided to receiving device 8B.

In addition, network devices (not shown) along paths 9 can support high-quality voice transmissions and still have a lengthy failure detection and recovery time. Even failures lasting multiple seconds may not result in degradation of voice quality, provided the failure is limited to fewer than all of paths 9. Although longer recovery times increase the potential for such simultaneous events to occur, this exposure may be insignificant if failures occur at infrequent intervals in comparison to the recovery time, which is typically the case in packet and cell-based networks. In addition, generation of additional duplicate packet flows 14 can further reduce the possibility of such degradation. Rather, with the redundancy afforded by multiple paths 9, voice information 22 will have an increased likelihood of reaching the intended destination.

Although illustrated in reference to one-dimensional voice transmissions, i.e., transmissions between voice communication devices 8, the techniques may be readily applied to bi-directional voice communication. In particular, using the techniques described above, network devices 20 may establish two or more duplicate packet flows (not shown in FIG. 1) to carry voice information from voice communication device 8B to voice communication device 8A, i.e., in reverse of the direction described above. Network devices 20 cooperate to select independent paths for carrying the data flows to increase the probabilities of high-quality voice communications, and reduce or minimize the possibility of a single network event degrading the voice quality.

Figure 2:
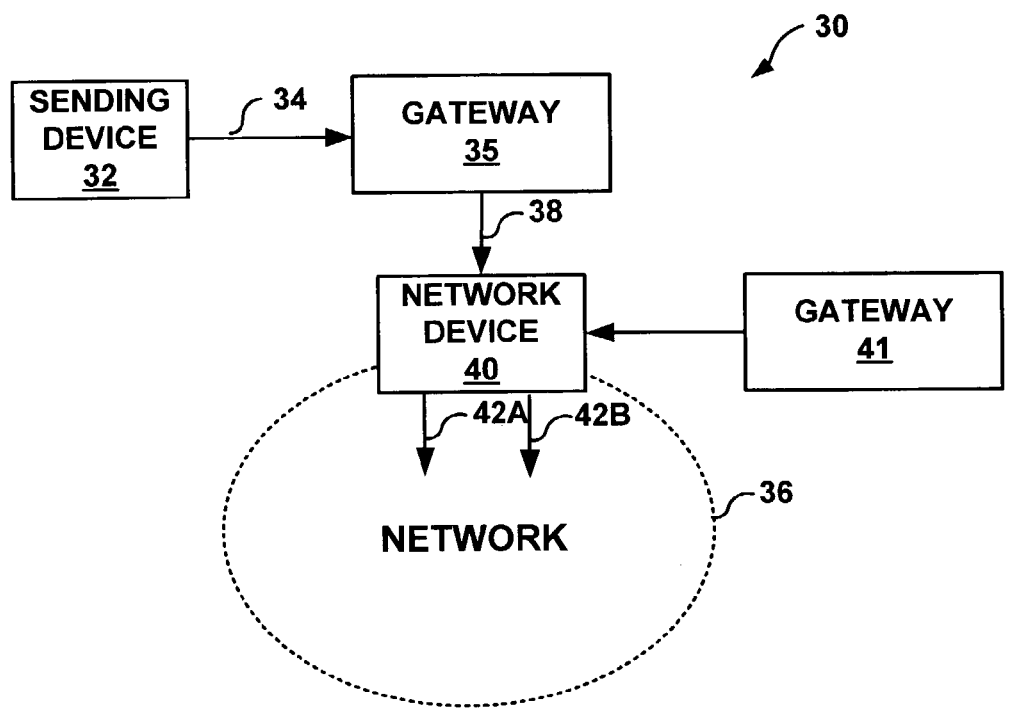
FIG. 2 is a block diagram illustrating another example system that makes use of data duplication for transmission of voice information in accordance with the principles of the invention.

FIG. 2 is a block diagram illustrating another example system 30 that makes use of data duplication for transmission of information in accordance with the principles of the invention. Again, voice is used as an example, but the techniques may be used with other data types. In the illustrated embodiment, sending device 32 outputs voice information 34 to gateway 35, e.g., in analog, digital or wireless form. Gateway 35 receives voice information 34, and provides the voice information to network 36 as a single data flow 38 carrying the voice information. In contrast to the exemplary embodiment of FIG. 1, network device 40, which may comprise a network router, switch, hub, or other network device, receives data flow 38, and generates duplicate data flows 42A, 42B to carry voice information 34. Network device 40 forwards data flows 42 through network 36 along paths selected to have reduced or minimal common infrastructure.

Although in the embodiment of FIG. 2 network device 40 may provide a single point of failure, establishment and maintenance of independent paths may be simplified as multiple network devices, e.g., network devices 18 of FIG. 1, need not cooperate to select the paths. Furthermore, network device 40 may support automatic generation of duplicate voice information from multiple gateways, e.g., gateway 41, and may automatically transmit the duplicate data over independent paths for transmission of voice information through network 36. In other words, network device 40 may be configured to automatically generate two or more duplicate packet flows to carry voice information received from gateways 34, 41. Network device 40 selects independent paths having little or no common infrastructure for the duplicate packet flows carrying the same voice information. In this way, network device 40 may achieve higher-quality voice transmissions through network 36 for multiple gateways, e.g., gateways 34, 44.

Figure 3:
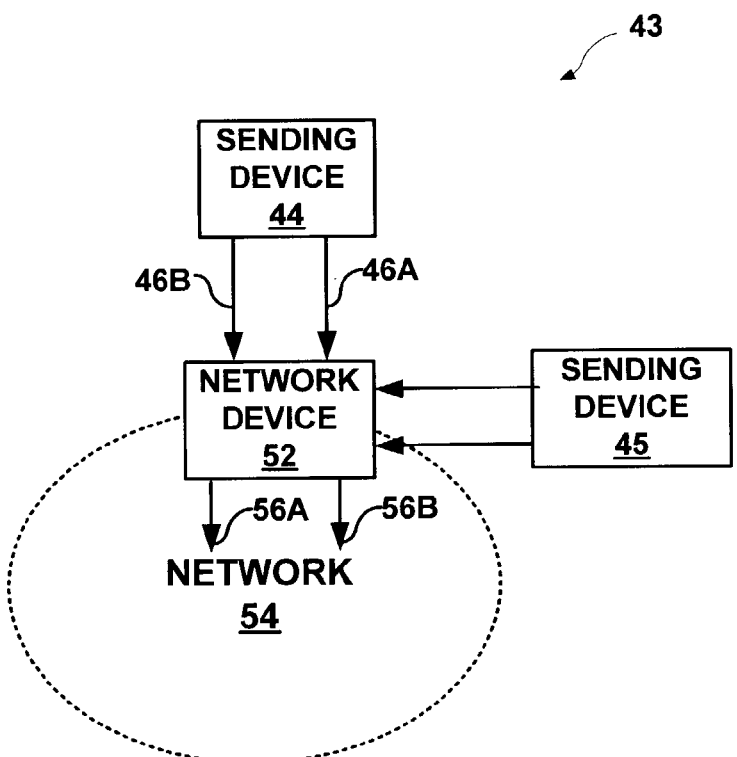
FIG. 3 is a block diagram illustrating another example system that makes use of data duplication for transmission of voice information in accordance with the principles of the invention.

FIG. 3 is a block diagram illustrating another example system 43 that makes use of data duplication for transmission of voice information in accordance with the principles of the invention. In the illustrated embodiment, sending device 44 outputs duplicate data flows 46A, 46B carrying duplicate voice information to network device 52, e.g., as packets. Sending device 44 may comprise, for example, an IP-enabled phone or other device capable of outputting data flows carrying voice information. Network device 52 receives duplicate data flows 46A, 46B, and forwards the data flows through network 54 along paths 56A, 56B selected to have reduced or minimal common infrastructure.

To facilitate the forwarding of multiple duplicate data flows along independent paths, sending device 44 may output data flows 46 to include data that marks each of the flows with a unique identifier. For example, sending device 44 may include data within data flow 46A marking the data flow as the primary data flow. Similarly, sending device 44 may include data within data flow 46B that marks the data flow as the backup data flow. Consequently, network device 52 receives data flows 46 that may otherwise appear as identical packets flows, and can easily separate the data flows and forward the flows through network 54 along separate paths. In addition, a receiving device may make use of the data to easily discard duplicate data, as described in further detail below.

Figure 4:
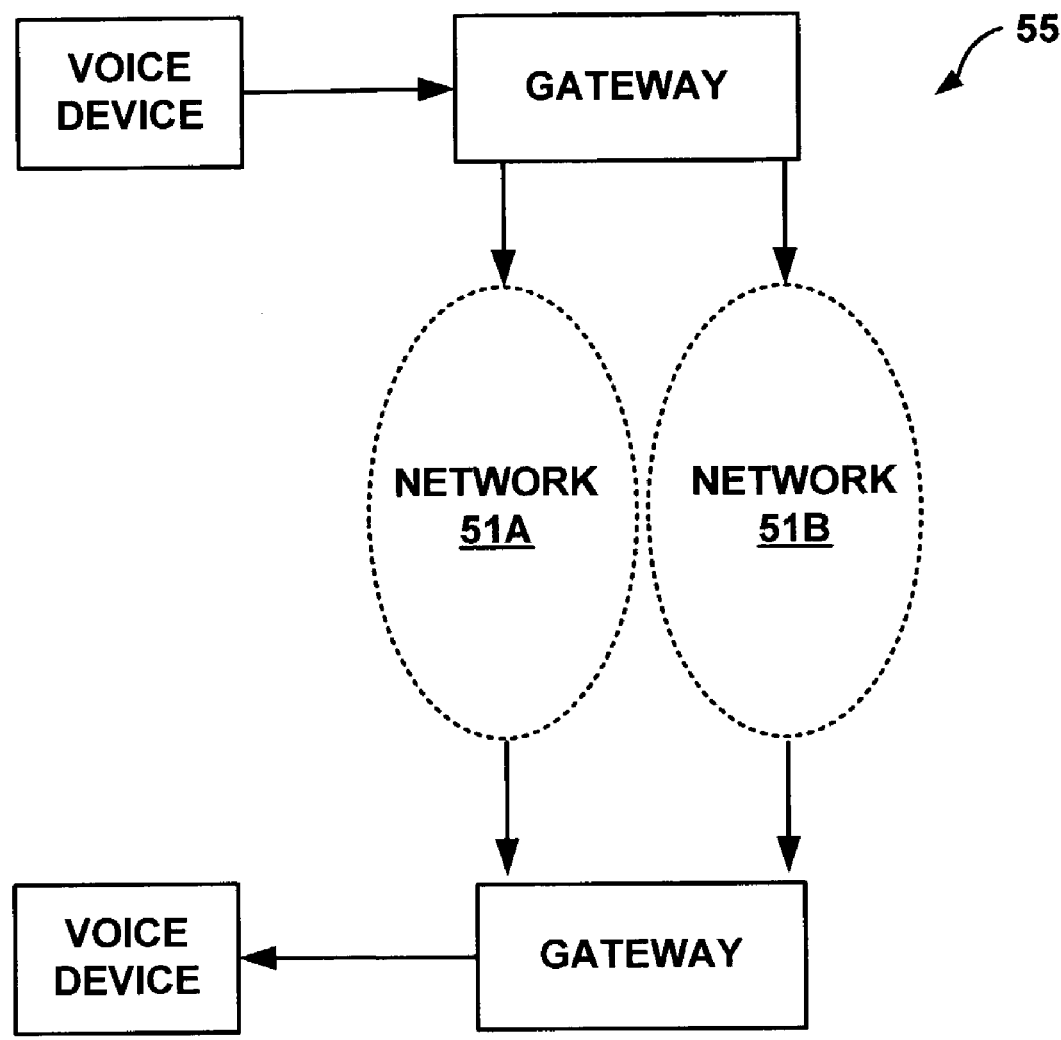
FIG. 4 is a block diagram illustrating yet another exemplary system in which duplicate voice information is delivered between voice communication devices via separate networks.
Figure 5:
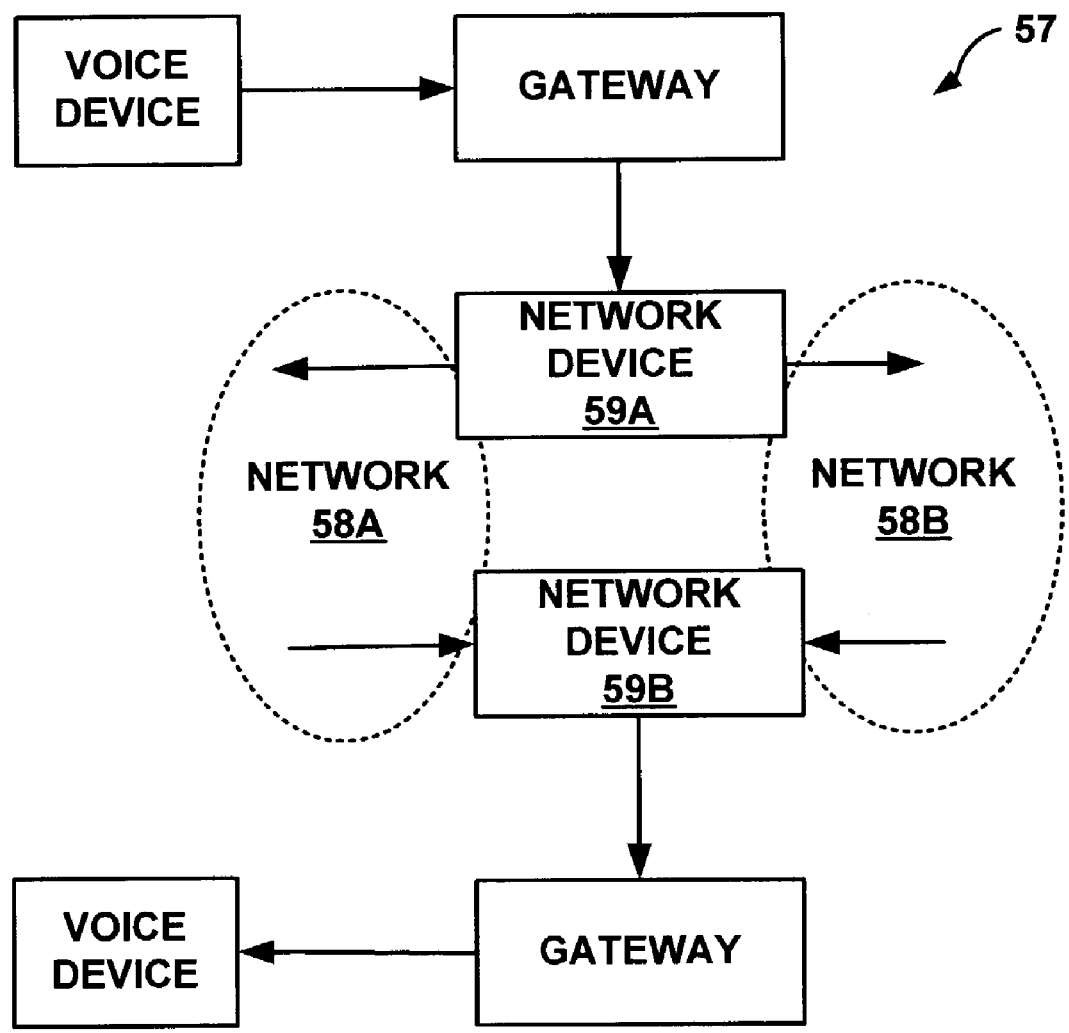
FIG. 5 is a block diagram illustrating an example system in which network devices, such as edge routers, communicate voice information via duplicate data flows through separate networks.

FIG. 4 is a block diagram illustrating yet another exemplary system 55 in which two separate networks 51A, 51B (herein networks 51) couple two voice communication devices. In this and similar environments, techniques for independent path selection need not be necessary. As illustrated in FIG. 4, for example, separate infrastructure, e.g., separate networks 51 may be used and arranged to automatically prevent the duplicate data flows from using any common network resources. FIG. 4 illustrates the duplicate data flows originating from a voice gateway. In contrast, FIG. 5 is a block diagram illustrating a system 57 in which network devices 59, such as edge routers, communicate voice information via duplicate data flows through separate networks 58A, 58B.

Figure 6:
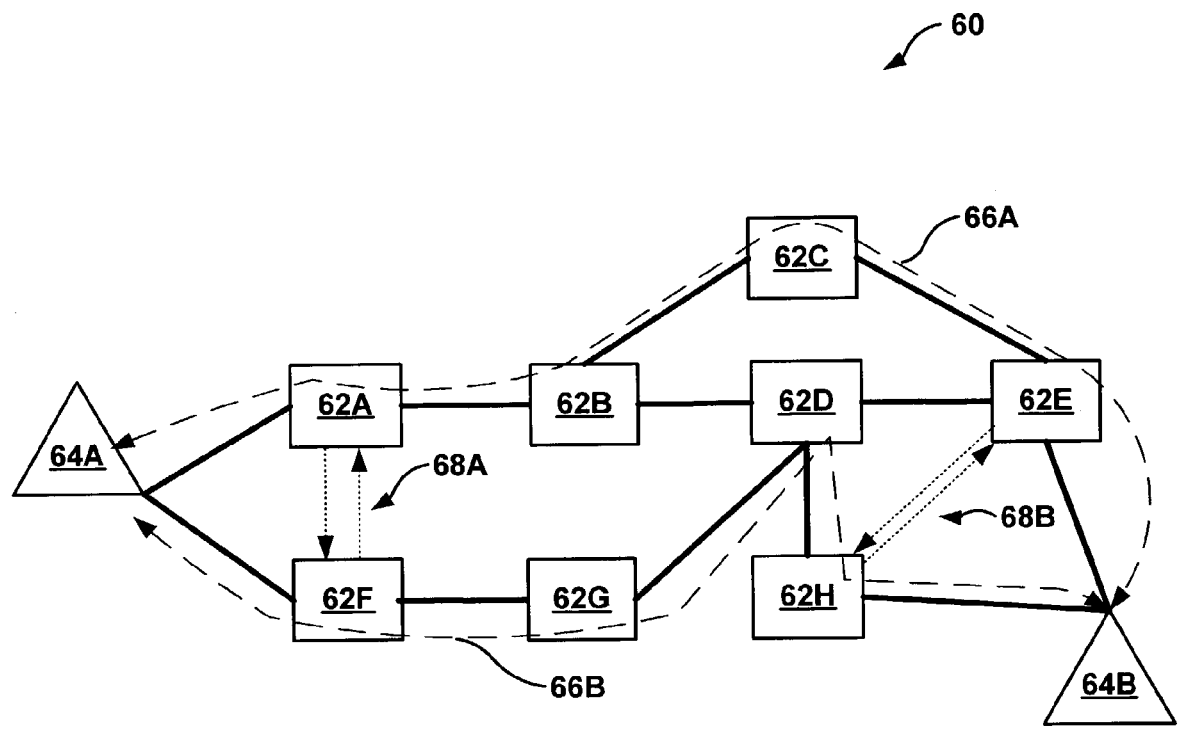
FIG. 6 is a block diagram further illustrating the selection of independent paths having reduced or minimal common network elements for forwarding duplicate voice transmissions in accordance with the principles of the invention.

FIG. 6 is a block diagram further illustrating the selection of independent paths for forwarding duplicate voice transmissions in accordance with the principles of the invention. As illustrated in FIG. 6, an example network 60 includes a plurality of nodes 62A-62H (herein nodes 62) connected by network links (illustrated as solid lines in FIG. 6). Nodes 62 may include routers, hubs, switches, and the like, for transporting units of data, e.g., packets, cells or frames.

Devices 64, which may be individual voice communication devices or voice gateways, send voice communications through network 60 using duplicate data flows 66A, 66B. More specifically, devices 64 maintain data flows 66A along a first path for communicating voice information, e.g., a telephonic conversation. This primary path consists of nodes 62A, 62B, 62C, and 62E. In addition, devices 64 concurrently use a second path to communicate data flow 66B that carries duplicate voice information. Specifically, this second path consists of nodes 62F, 62D, 62D, and 62H.

In one embodiment, one or more of devices 62A, 62F 62E and 62H may be configured with information that defines certain paths that should be used when transferring certain data from devices 64. The configuration information may be form another device on network 60, or from a network administrator, or a combination of these.

Devices 62A, 62F may exchange path selection information 68A to facilitate the selection and establishment of independent paths for carrying flows 66 from device 64A to device 64B. Similarly, devices 62E, 62H may exchange path selection information 68B to facilitate the selection of independent paths from device 64B to 64A. In other words, data flows 66 may comprise four separate data flows, each of which may take a separate path. Devices 62A, 62F, 62E, 62H may, for example, establish LSPsin accordance with the Multi-Protocol Label Switching (MPLS) protocol. In this manner, devices 64 concurrently communicate duplicate voice information via multiple paths selected to have reduced or minimal common network elements, referred to herein as "independent" paths.

In one embodiment, consistent with the principles of the invention, the path selection information 68 exchanged by devices 62A, 62F, 62E, 62H may take the form of "fate-sharing" information. As used herein, the term "fate-sharing" generally refers to techniques for relating groups of network elements, e.g., nodes or links, according to common characteristics, attributes or shared resources, e.g., a shared power supply, close proximity, common physical interface, for the purposes of facilitating selection of independent paths. More specifically, the fate-sharing information may describe the relationships between elements of the network, such as routers, switches, links, fiber paths, gateways, interface cards, e.g., a Gigabit Ethernet interface, an ATM or a Frame Relay interface, a group of fibers sharing a common fiber conduit, a set of optical channels that share the same fiber, a set of links that connect to the same switch or other device, a set of equipment sharing the same power source, and the like.

Each network element, or group of elements, may have a configurable "cost" attributed to it, which represents the level of impact this group has on the fate-sharing computations. The higher the cost, the less likely a duplicate path will share any objects in the group with the other paths. Consequently, the cost can be viewed as directly comparable to traffic engineering metrics, and can be expressed as a relative number. Changes to the fate-sharing information directly influence duplicate path computations. Further details regarding the use of fate-sharing information are described in co-pending U.S. patent application to Der-Hwa Gan having Ser. No. 09/795,454, filed Mar. 1, 2001 and entitled "METHOD AND APPARATUS FOR COMPUTING A BACKUP PATH USING FATE SHARING INFORMATION," the content of which is hereby incorporated by reference.

FIG. 7 illustrates example data structures maintained by a network device, e.g., network devices 62A, 62F, 62E, 62H of FIG. 6, to associate cost information with network elements. In the example of FIG. 7, fate-sharing information 70 is arranged as a table that defines groups of network elements (column 1), and associates a cost (column 2) with each of the defined groups. Fate-sharing information 70 may define, for example, a first network group comprising nodes 62B, 62C (nodes in FIG. 6), and associate a relative cost of 500 with the group. As additional examples, fate-sharing information 70 defines a second network group including nodes 62F, 62G, a third group including links 62A-62B, 62B-62C, 62C-62E, and a fourth group including links 62F-62G. Fate-sharing information 70 associates relative costs of 600, 400, and 600, respectively, to these groups.

Exchange of fate sharing information 70 and cooperation during the path selection process is one way in which devices 62A, 62E, 62F, 62H can select and establish paths that minimize or otherwise reduce the number of elements of a network shared by the duplicate paths for carrying voice communication. Specifically, devices 62A, 62F, may cooperate to select a primary path and one or more backup paths having little or no common network elements to carry voice information from device 64A to device 64B. Similarly, devices 62E, 62H, may cooperate to select a primary path and one or more backup paths to carry voice information from device 64B to device 64A. Consequently, devices 62A, 62E, and devices 62F, 62H concurrently forward data flows 65 along independent primary and backup paths that similarly share few or no common network elements, thereby promoting a reduced or minimal amount of data loss due to network events.

FIG. 8 illustrates example data structures maintained by network device 62A, 62F of FIG. 6 to describe the independent paths. Specifically, path data 75 indicates that devices 62A, 62F cooperate to concurrently transmit duplicate voice communications from device 64A to device 64B over a primary path (62A, 62B, 62C, 62E), and a backup path (62F, 62G, 62D, 62H). FIG. 9 illustrates example data structures maintained by network device 62E, 62H and defines a primary path (62E, 62C, 62B, 62A) and a backup path (62H, 62D, 62G, 62F) to concurrently transmit voice communication in the reverse direction, i.e., from device 62B to device 62A.

The data structures in FIGS. 7-9 are illustrated for exemplary purposes only, and may be arranged in any number of forms, and may store a wide variety of additional data. For example, fate-sharing information 70 and path data 75, 77 may be stored in databases, arranged as radix trees, link lists, configuration files, and other data structures. A network device, such as devices 62A, 62E, 62F, 62H of FIG. 6, may store the data structures within a variety of types of computer-readable media, such as non-volatile random access memory (NVRAM), read-only memory (ROM), dynamic random access memory (DRAM), FLASH memory, magnetic media, optical media, and the like.

Figure 10:
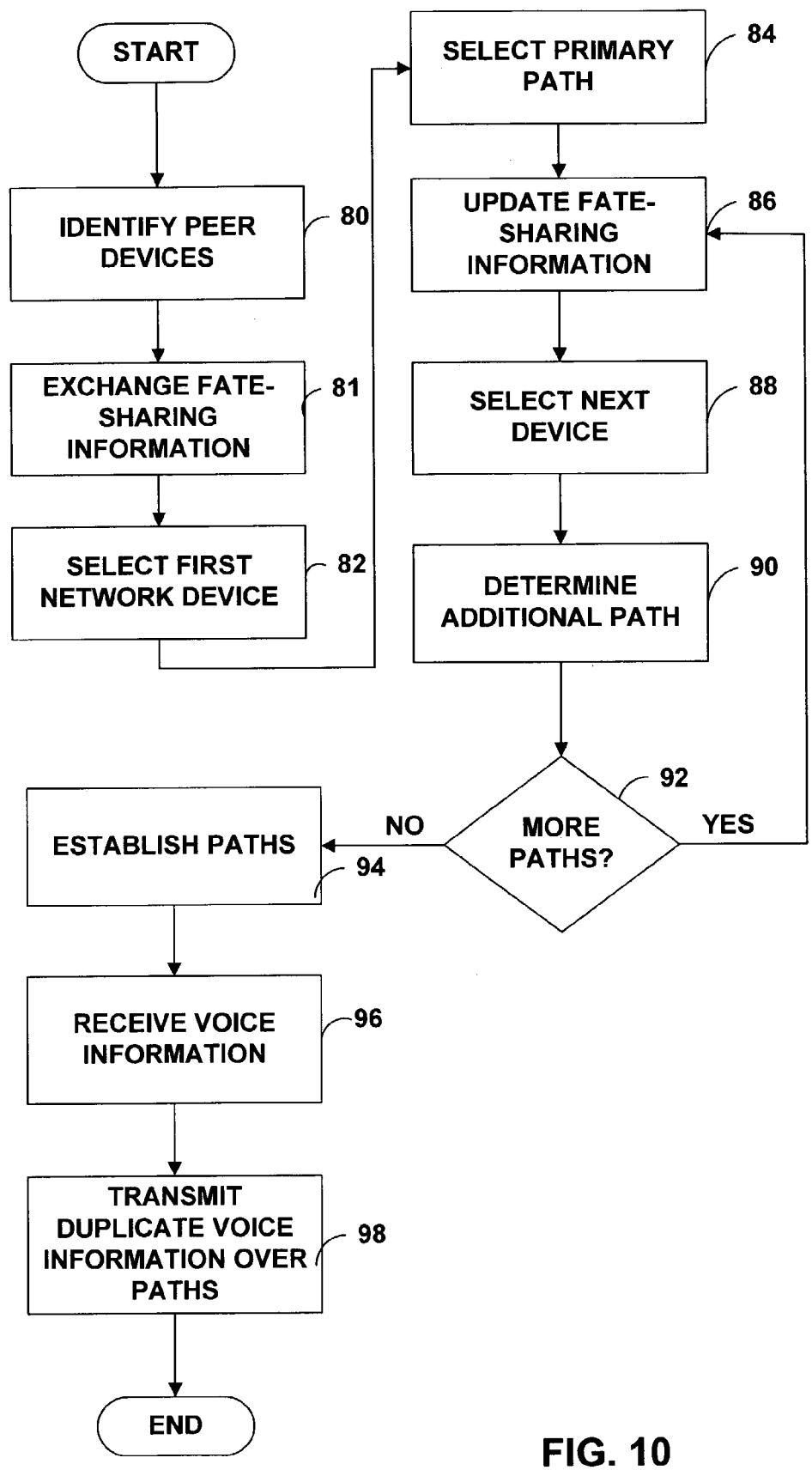
FIG. 10 is a flowchart illustrating an exemplary process by which one or more network devices select two or more duplicate paths for transmitting voice information through a network.

FIG. 10 is a flowchart illustrating an exemplary process by which one or more network devices select two or more duplicate paths for transmitting voice information through a network. In particular, the flowchart describes the process by which a set of one or more network devices receive voice information from a common voice communication device or voice gateway, and select independent paths for carrying duplicate voice information. As an example, network device 62A, 62F of FIG. 6 may operate according to the following process to select and establish primary and secondary paths for carrying data flows 66 from device 64A to device 64B.

Initially, the network devices may establish peer sessions to identify peer devices coupled to a common voice communication device or gateway (80), and to exchange path selection information, such as fate-sharing information, as described above (81). Next, the network devices may cooperate to select one of the devices as a candidate for carrying data flow along a primary path to the destination voice communication device (82). For example, the network devices may arbitrate for operation as a master device, may operate in accordance with a defined selection order, or similar technique. As an example, network devices 62A, 62F (FIG. 4) may agree to select network device 62A as the first device to perform path selection.

The selected network device computes a primary path using shortest-path techniques independently of any fate-sharing information (84). In other words, the device may apply standard path-resolution techniques to determine a shortest path to the destination voice communication device, e.g., nodes 64A, 64B, 64C, and 64E of FIG. 6 for carrying data flow 65A.

Upon establishing a primary path, the selected network device updates the fate-sharing information based on the determined primary path (86). Specifically, the network device first identifies all fate-sharing groups or individual elements that are associated with the computed primary path. For example, the device may identify all links and nodes that the primary path traverses, and compile lists that contain at least one of the links or nodes. The device then checks each link of the network topology, except the ingress and egress link, against the compiled lists. If the link is a member of any of the lists, the device increases the cost associate with the link by the cost associated with the group. If a link is a member of multiple groups, the device adds all group costs together to determine the adjusted cost. Similarly, the device performs the check for every node in the topology, except the ingress and egress node of the path. In this manner the individual costs of network elements and groups of elements can be updated based on the primary path selected to carry the voice information. Upon updating the fate-sharing information, the selected network device communicates the updated fate-sharing information to the other devices, e.g., from network device 62A to network device 62F.

Next, the devices identify and select a second device (88) to determine an additional path for concurrently carrying duplicate voice information between the voice communication devices (90). In particular, this second device computes path selection, e.g., route resolution for a network router, based on the adjusted fate-sharing information. As an example, network device 62F of FIG. 6 may determine the backup path (62H, 62D, 62G, 62F) for carrying data flow 66B.

The network devices repeat this cooperative process until the primary path and all backup paths have been determined (92), which typically requires determining a backup path for each of the network devices. For example, devices 62A and 62F would not repeat the process as only a primary path and only a single backup path would have been determined. In systems having more than two network devices receiving common voice communication data, the process may be repeated until a path is determined from each of the network devices to the destination voice communication device. In addition, the process may be repeated to establish multiple paths originating from the same network communication device.

Once all of the paths have been determined, the devices may establish the path through the intermediate network (94), typically by using a signaling protocol to reserve bandwidth or other resources within the network. For example, the network devices may construct LSPs within the network in accordance with a protocol, such as the MPLS protocol. To configure the LSPs within the network, the devices may issue control messages specifying a sequence of hops within the network for each LSP. The control messages flow through the network, and communicate the necessary label-forwarding information to the internal devices. In this manner, the devices may establish paths through the network for transporting duplicate voice information, and may reserve resources with the network for supporting the transmissions. Alternatively, the network devices may dynamically establish the LSPs as needed, or may simply forward the voice information in accordance with the determined paths without using established paths.

Upon receiving voice communication data (96), e.g., from a voice communication device or from a voice gateway, the network devices forward duplicate voice information through the paths (98). For example, the network devices may forward the data through LSPs via MPLS packets.

Although described in reference to distributed path resolution, the invention is not so limited. For example, a central device acting as a master device may compute path data identifying the primary and backup paths for concurrently carrying duplicate voice information, and may distribute the data to one or more slave network devices. For example, network device 62A may determine both the primary and backup paths for concurrently carrying data flows 65, and may communicate the path data to network device 62F. As described above, the central device updates the fate-sharing information upon computing the primary path and each backup path.

Furthermore, as illustrated in FIG. 3, a single network device may receive voice communication data, and may source multiple duplicate data flows over independent paths. In this environment, the network device computes path data identifying the primary and backup paths for concurrently carrying duplicate voice information, and need not distribute the data to other network devices.

In addition, in some environments, independent path selection may not be necessary. As illustrated in FIGS. 4, 5, for example, separate infrastructure, e.g., separate networks, may be used and arranged to automatically prevent the duplicate data flows from using any common network resources.

Figure 11:
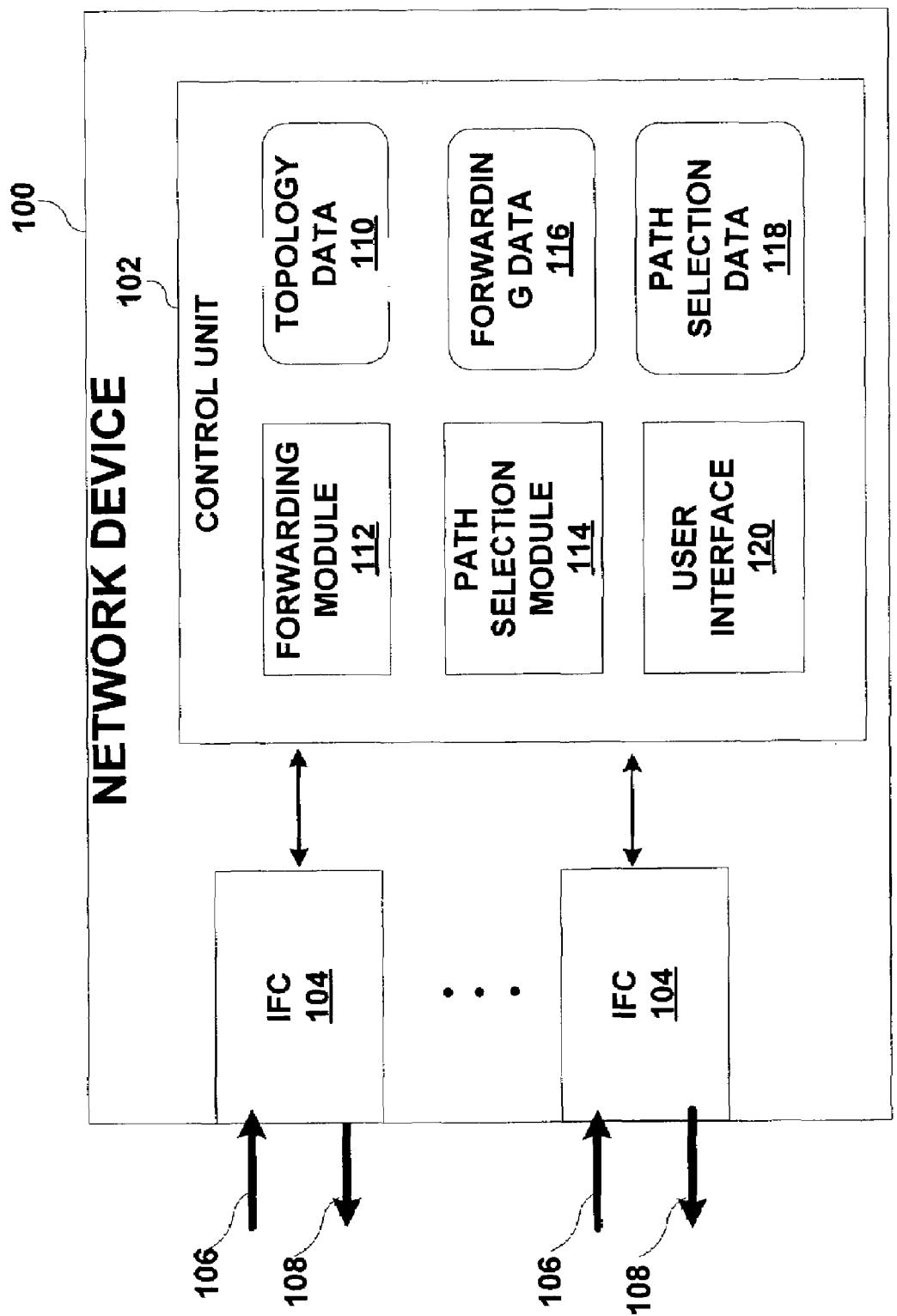
FIG. 11 is a block diagram of an example embodiment of a network device that makes use of data duplication for transmission of voice information in accordance with the principles of the invention.

FIG. 11 is a block diagram of an example embodiment of a network device 100 that makes use of data duplication for transmission of voice information in accordance with the principles of the invention. In the exemplary embodiment illustrated in FIG. 11, network device 100 includes interface cards (IFCs) 104 for communicating packets via network links 106 and 108. IFCs 104 are typically coupled to network links 106, 108 via a number of interface ports.

Network device 100 includes a control unit 102 that maintains topology data 110 to describe a topology of a network. In particular, topology data 110 describes various nodes and links within one or more networks, such as network 10 of FIG. 1, and describes paths for traversing the network. For example, topology data 110 may describe one or more duplicate paths for communicating voice information to a destination, e.g., a voice gateway or voice communication device.

Control unit 102 maintains forwarding data 116 in accordance with topology data 110 for use during the process of forwarding discrete data units, e.g., packets, cells or frames. Forwarding data 116 may, therefore, be thought of as derived from the information contained within topology data 110. As one example, for a packet-based network, forwarding data 116 associates packet information, referred to as a "key," with specific forwarding next hops (FNH). A FNH generally refers to a neighboring router or other network device physically coupled to a source router along a given route. For example, the FNH for a route may specify a physical interface and media access control (MAC) address for the interface associated with the router. Forwarding data 116 associates the next hops with the interfaces ports of IFCs 104 that couple network device 100 to network links 108. Path selection module 114 of control unit 102 generates and maintains forwarding data 116 based on topology data 110 and path selection data 118. In particular, path selection data 118 associates cost information with elements of the network, as described by way of example with reference to fate-sharing information 70 of FIG. 7. Path selection module 114 may communicate with peer network devices to cooperatively update path selection data 118 and select paths for concurrently carrying the duplicate voice information, as described in reference to FIG. 10. In this manner, path selection module 114 may generate forwarding data 116 for forwarding duplicate voice information along one or more paths, e.g., LSPs, within the network. Furthermore, these paths may be independent from paths used by one or more other devices in the sense that the paths use reduced or minimal common network elements in accordance with defined cost information.

Control unit 102 may store topology data 110, forwarding data 116, and path selection data 118 on one or more computer-readable media, such as a magnetic medium, optical medium, non-volatile random access memory (NVRAM), FLASH memory, or the like. Control unit 102 may maintain the data in the form of a variety of data structures, such as tables, radix trees, flat files, and databases.

Path selection module 114 may receive configuration input from user interface 120 that describes a set of pre-established paths, e.g., LSPs, or may dynamically generate control information for forming the paths through the intermediate network in response to receiving the requests. Control unit 42 presents user interface 120 by which a user, such as a system administrator, or a remote scripting utility may provide the configuration input.

When operating as an "ingress" network device coupled to a transmitting voice gateway or a voice communication device, e.g., network device 18A of FIG. 1, one or more IFCs 104 receive voice information and communicate the voice information to control unit 102. Forwarding module 112 selects an appropriate next hop for the voice information based on forwarding data 116, and forwards the voice information via one or more IFCs 104. For example, one or more bits within the data unit, e.g., within a header of a packet, may encode whether the data unit corresponds a primary or a backup data flow. The device responsible for duplicating the voice information, such as gateway 16A of FIG. 1, network device 40 of FIG. 2, or sending device 44 of FIG. 3, may set the bits upon generating the duplicate data. Control unit 102, may receive the primary data units and select the appropriate next hop based on the designated data flow. Control unit 102 may determine a path for the voice information, and may attach an appropriate path identifier to the data, such as an MPLS label, for forwarding the data along a pre-established path. In this example, end-to-end voice communications may be transmitted through an intermediate network encapsulated within MPLS packets associated with one or more LSPs. In some devices, such as network device 40 of FIG. 2, control unit 102 may automatically generate duplicate voice information, and may communicate the duplicate voice information along two or more paths to the receiving device in accordance with forwarding information 116.

When operating as an "egress" network device, e.g., network device 20A of FIG. 1, one or more IFCs 104 receives the voice information from the intermediate networks, and communicate the voice information to control unit 102. Control unit 102 may process the voice information to remove the path identifiers, e.g., MPLS labels, to extract the voice information in original digital form. Control unit 102 forwards the voice information to the destination device, such as the voice gateway or the voice communication device.

If duplicate voice information is received, control unit 102 may automatically discard the duplicate data, or may forward the duplicate data for processing by the receiving device. Control unit 102 may examine the encoded bits to determine whether the received data corresponds to a primary or backup data flow, and may automatically drop the backup data units. For example, control unit 102 may maintain an input buffer and, upon an interruption that exceeds a length of time, may start processing the backup data units. Alternatively, this operation may occur at the receiving gateway, such as gateway 16B of FIG. 1, or even the receiving device, such as receiving device 8B of FIG. 1.

The architecture of network device 100 illustrated in FIG. 11 is for exemplary purposes only. The invention is not limited to this architecture. In other embodiments, network device 100 may be configured in a variety of ways. In one embodiment, for example, control unit 102 and its corresponding functionality may be replicated and incorporated directly within IFCs 104.

As previously mentioned, although described in reference to voice communication, the techniques are not so limited. For example, network devices may apply the techniques to forward duplicate data along multiple independent paths. In this manner, transmission of other types of data, e.g., audio data streams, video data streams, binary data, and other transmissions, can be duplicated and forwarded along paths that share reduced or minimal common network elements.

Various embodiments of the invention have been described. These and embodiments are within the scope of the following claims.

The invention claimed is:

1. A system comprising:
a voice communication device to generate voice information;
a gateway to duplicate the voice information; and
one or more network devices to forward the duplicate voice information, along a plurality of paths through plurality of computer networks, wherein each of the plurality of paths is located in a separate computer network;
wherein at least one of the network devices selects the paths based on a computer-readable medium that stores fate-sharing data that associates costs with network elements of the computer network, wherein the fate-sharing data describes relationships between elements of the network that share one or more common characteristics, and wherein costs comprise a value specifying a level of impact the element has on the path selection.

2. The system of claim 1, wherein the one or more network devices comprise a single network device that selects the paths through the network based on network elements shared by the paths.

3. The system of claim 1, wherein the one or more network devices comprise a plurality of network devices that cooperate to select the paths through the network based on network elements shared by the paths.

4. The system of claim 3, wherein the one or more of network devices exchange the respective fate-sharing data.

5. The system of claim 1, wherein the one or more of network devices select a first path within the network, update the fate-sharing data based on the selected first path, and select a second path based on the updated fate-sharing data.

6. The system of claim 1, wherein the one or more of network devices establish the paths through the network as label switched paths (LSPs) to carry the duplicate data.

7. The system of claim 1, wherein the one or more of network devices comprises at least one router that communicates the voice information as packets.

* * * * *